United States Patent [19]
Shimoda et al.

[11] Patent Number: 5,812,734
[45] Date of Patent: Sep. 22, 1998

[54] RECORDED SIGNAL GENERATING APPARATUS

[75] Inventors: Kenji Shimoda; Yoshihisa Sakazaki, both of Kanagawa-ken, Japan

[73] Assignee: Kabushiki Kaisha Toshiba, Kawasaki, Japan

[21] Appl. No.: 712,172

[22] Filed: Sep. 11, 1996

[30]     Foreign Application Priority Data

Sep. 13, 1995  [JP]  Japan ................................ 7-235720

[51] Int. Cl.$^6$ ................................................. H04N 5/783
[52] U.S. Cl. ........................... 386/81; 386/95; 386/111; 369/48
[58] Field of Search ............................... 386/95, 97–98, 386/109, 111–112, 68, 81; 360/48, 27; 369/48; H04N 5/783, 5/76, 5/92

[56]         References Cited

U.S. PATENT DOCUMENTS

| 5,065,259 | 11/1991 | Kubota et al. ............................... 386/7 |
| 5,231,543 | 7/1993  | Kubota et al. ............................. 386/90 |
| 5,596,581 | 1/1997  | Saeijs et al. ............................. 386/104 |

FOREIGN PATENT DOCUMENTS

| 0 566 816 | 8/1993  | European Pat. Off. . |
| 0 612 186 | 8/1994  | European Pat. Off. . |
| 0 712 123 | 5/1996  | European Pat. Off. . |
| 6-278097  | 11/1994 | Japan . |
| 7320413   | 12/1995 | Japan . |

OTHER PUBLICATIONS

Specification for Recording of DVB Programs on DVC. Recording of Single Programs. Version 20, 46 pages.
General Outline of Standard for ATV Recording on DVC, Apr. 6, 1995, pp. 1–7.
IEEE Transactions on Consumer Electronics, vol. 40, No. 3, Aug. 1994, Data–Placement Procedure for Multi–Speed Digital VCR, F.Azadegan et al. pp. 250–256.
Minutes and Attendants of the 6th. DVB WG Meeting. This reference shows when and what of DVB recording format was discussed 5 pages.

*Primary Examiner*—Andrew I. Faile
*Assistant Examiner*—Luong Nguyen
*Attorney, Agent, or Firm*—Cushman Darby & Cushman IP Group of Pillsbury Madison & Sutro LLP

[57]            ABSTRACT

A transmitted signal is supplied to a transmission rate information extraction circuit, where information on the transmission rate is extracted. A recording mode setup circuit sets a recording mode based on the transmission rate and a mode designated by a user. An additional data modification circuit sets a recording rate of an additional data according to the recording mode. Then, a transmitted signal/recorded signal conversion circuit assigns a part or all of the recording rate of the additional data to a recording rate of data for normal playback to lengthen recording time of the data for normal playback. By means of this, recording efficiency increases.

16 Claims, 11 Drawing Sheets

RECORDED SIGNAL GENERATING APPARATUS

BACKGROUND OF THE INVENTION

1. Field of the Invention

The present invention relates to a recorded signal generating apparatus for converting into a recorded signal a transmitted signal encoded into efficient codes.

2. Related Art Statement

Recently, with establishment of efficient coding technology for images, digital image processing has been widespread. The efficient coding technology is to encode image data using a few bit rate so as to increase efficiency of digital transmission and recording. MPEG (Moving Picture Experts Group) 1 (ISO/IEC11172) has already been used in video CDs, CD-Is, and the like.

In addition, standardization of MPEG-2 is almost completed, the MPEG-2 which is a standard corresponding to image quality of current broadcasting. Digital broadcasting has been researched which uses efficient coding based on these standards.

For example, in U.S.A., ATV (Advanced TV) has already been in an experimental stage, the ATV that adopts the efficient coding. Moreover, DirectTV, PrimeStar, and the like that are in current broadcasting systems are using the efficient coding to perform commercial digital broadcasting where electric waves from satellites are received.

Furthermore, in Europe, DVB (Digital Video Broadcasting) adopting the efficient coding has been researched. The DVB corresponds not only the current broadcasting system, but also various types of broadcasting systems using high-definition TV broadcasting satellites, ground waves, and cable systems, experimental broadcasting of which will start in the end of 1995.

By the way, a recording apparatus is investigated which receives and records signals in the efficient coding, the signals being transmitted in digital broadcasting. Regarding a digital VTR compressing, decompressing, recording and playing signals a little different from the MPEG standard, in the voluntary conference, HD-DVCR Conference discussing the standards for the recording format of the digital VTR and the like, there are SD (Standard Definition) and HD (High-Definition: The ATV is the same type.) standards corresponding to current broadcasting signals SD and high-definition signals HD.

On the other hand, when recording a digital broadcasting signal, a method for recording and playing information signals such as video, sound and the like is adopted instead of the compression method according to the SD and HD standards. For example, as the standard for a digital VCR recording and playing U.S.A. ATV signals, the standard for VCRs conforming to the ATV was regulated in April 1995. In addition, the standard for VCRs was also regulated in November 1995, which was the standard for digital VCRs conforming to the DVB in Europe.

In MPEG2, it is regulated to transmit transmitted data by the packet to let time-sharing multiplexing of a plurality of video, audio, data, and the like be easy. A packet is composed of the same sort of data, each of which an identification signal showing the sort of the data is added to. An MPEG2 decoder has a function to refer to identification signals (PID) from packets sequentially inputted, and to extract packets having the same PID. By means of this function, the decoder can decode only the desired program from the transmitted data. For example, even if a multichannel data stream including the coded data of a plurality of images A, B, C, . . . , is inputted, a desired image can be displayed in a TV set conforming to the MPEG2 standard.

In recording such a multichannel data stream, if a general VCR corresponding to a transmission rate is used, its recording time is the same as that in recording all transmitted data even if only one sort of data is recorded among all transmitted data. Technology relevant to this is described in the specification of Japanese Patent Application No. 6-278097 (hereinafter: Doc. 1). This application relates to a magnetic recording and playback apparatus capable of recording and playing information having different signal rates. And, this describes technology making a recording rate varied by not only changing a transfer speed of a magnetic tape according to a recording rate, but also making a magnetic head intermittently trace the tape according to the recording rate.

If a user uses a VCR which has variable recording rate and is shown in the Doc. 1, it becomes possible to record only one or several sorts of data selected from the transmitted data at the rate based on the signal rate of each data. Therefore, it becomes possible to obtain recording time longer than that in recording all transmitted data. For example, if the data rate of a sort of selected data is ⅓ of the transmission rate of the transmitted data, a tape speed specified in normal playback is set at ⅓ of the standard speed for recording and playback. Hence, it becomes possible to obtain threefold recording time.

Regarding the ATV in U.S.A., the transmission rate of transmitted signals is fixed at 19.4 Mbps, and hence, it is not necessary to modify the recording rate of a VCR. On the other hand, in regard to the DVB in Europe, the transmission rate of transmitted information is not fixed, and hence, there is a possibility that the transmission rates are different by the program or transmitting channel. In this case, according to the transmission rate to be recorded, it is convenient to let the recording mode of a VCR be changeable. In consideration of this point, in the HD-DVCR Conference, it was investigated to equip each VCR with the modes which were besides a standard mode having the recording rate of 25 Mbps (standard rate) (hereinafter: SD mode), the mode having the recording rate two times as fast as the standard rate (hereinafter: 2SD mode), the mode having the recording rate a half times as fast as the standard rate (hereinafter: ½-SD mode), the mode having the recording rate a fourth times as fast as the standard rate (hereinafter: ¼-SDmode), and the like.

FIG. 11 is an explanatory drawing for explaining a recording format of a magnetic tape standardized in the HD-DVCR Conference.

A record track has an audio recording area and a video recording area in the direction from the lower end of the tape to its upper end. The reason why the track is provided with the audio recording area and video recording area is to correspond to the case that a VCR side performs the efficient coding like the SD and HD standards.

On the other hand, since, in a VCR conforming to the ATV or DVB, an information signal already encoded into efficient codes is transmitted, the transmitted information signal is recorded only in the video recording area. In the standard for VCRs conforming to the ATV, the video recording area includes areas recording product codes ECC1 and ECC2. Furthermore, in the standard for VCRs conforming to the ATV, in consideration of necessity of greater error correction capability, an error correction parity area for recording an error correction code (hereinafter: ECC3 area), ECC3 code per track is prepared.

In addition, FIG. 12 is an explanation drawing showing a detailed recording format in a transmitted data area shown in FIG. 11. Numbers in the upper portion of the drawing show track numbers, and numbers in the lower portion show sorts of pilot signals for tracking.

A digital VCR adopts a modulation method of generating a low frequency component (hereinafter: digital pilot tone), which becomes a pilot signal, by intentionally making a DSV (charge-storage value) of a record modulating signal fluctuated. Since the spectrum of a primary signal itself only gathers together in a specific low frequency area, and other signal does not occurs, this modulation method is effective because interference waves to the primary signal are not multiplexed.

For example, three sorts of pilot signals F, F1 and F2 having frequencies f0, f1, and f2 respectively are recorded cyclically on record tracks of a magnetic tape. That is, on each record track, any one of pilot signals F1, F0, F2, F0, F1, F0, F2, and soon is recorded. In addition, usually, the pilot signal F0 is a null signal. In a code volume, levels of the pilot signals F1 and F2 are compared, the pilot signals which are included in a playback signal and come from the adjacent tracks. Then, the VCR is controlled so that the compared levels may become equal, that is, so that track phases may become equal to that of the track where the pilot signal F0 is superposed.

However, in case of recording on a recording media the image data compressed conforming to the MPEG standard, code volume is different between a frame compressed within the frame and a frame compressed between frames. Therefore, since a vertical position of the image data on a screen does not correspond to a vertical position on the recording media, it is not always possible to reproduce a frame with playback data in high-speed playback. Furthermore, since the frame compressed between frames cannot be decoded with a single frame, it becomes impossible to play a frame back in case it occurs that a frame cannot sometimes be decoded like in the high-speed playback.

Then, in a specification for Japanese Patent Application No. 6-065298 (hereinafter: Doc. 2), relevant technology is proposed. In this Doc. 2, a method is proposed which is a method for intermittently recording data for high-speed playback at a position of each track where a head passes in high-speed playback. In the playback mode, using this method, high-speed playback images can be obtained by exactly tracing areas where the data for high-speed playback are recorded.

Namely, in a magnetic recording and playback apparatus, there are areas on a magnetic tape (hereinafter: recording area of data for special playback) which are always traced in the high-speed playback when a tracking phase is controlled. With head tracing in high-speed playback, it is possible to play data for special playback that are recorded in these areas by tracing the recording areas of data for special playback. That is, in recording, inputted encoded data is recorded in areas except the recording area of data for special playback as data for normal playback. On the other hand, a special playback packet is recorded in recording areas of data for special playback, the packet which is produced through packetizing data for special playback which is generated from a part of encoded data, for example, image data compressed within a frame.

Filled portions and diagonally shaded portions in FIG. 12 show such recording areas of data for special playback. For example, the filled portions are recording areas of data for special playback (hereinafter: 18X-area) which are used for 18-fold speed playback. Further, the diagonally shaded portions are recording areas of data for special playback (hereinafter: 4X-area) which are used for quadruple-speed playback. Residual portions are recording areas of data for normal playback.

A track where the pilot signal F0 is recorded (hereinafter: F0 track) has six 18X-areas, and a track where the pilot signal F1 is recorded (hereinafter: F1 track) has a 4X-area. Further, as data for special playback, for example, direct-current data is used which is included in a signal compressed within a frame (one frame data) included in an encoded signal between frames conforming to the MPEG2 standard. Furthermore, depending on its data volume, a low frequency signal among alternating current data as well as the direct-current data may be used. In addition, these data are recorded in the recording areas of data for special playback after these data are converted again into a signal line conforming to the MPEG standard.

Assume that, adopting such a recording format, data are recorded in a mode corresponding to a transmitted signal rate. As described above, by not only making a transfer speed of a magnetic tape varied according to a recording rate, but also making a magnetic head intermittently trace the tape according to the recording rate, the recording rate is made to be variable. For example, in the ½-SD mode, a tape speed is set at a half speed in the standard mode, while recording is performed on every other track. Further, in the ¼-SD mode, a tape speed is set at one-fourth of speed in the standard mode, while recording is performed on a track per four tracks. By means of this, it is possible to perform variable-rate recording without making a track pitch changed. Furthermore, it is possible to make data recorded in two channels simultaneously.

Moreover, a flag is recorded in each data recording area, the flag which is used for discriminating in a playback mode whether playback data is data for normal playback, data for special playback, or other data. By discriminating this flag, it is possible to extract only the necessary data to decode it. For example, in normal playback, using only the data, to which the flag showing that the data is for normal playback is added, normal playback images can be decoded.

By the way, a recording mode is determined corresponding to the transmission rate of transmitted data. Let a whole recording rate in the standard mode be 25 Mbps, and further let the recording rate of the data for normal playback in the whole rate be 19.4 Mbps. Therefore, the recording rate is 5.6 (=25−19.4) Mbps, the rate which is assigned to the data for special playback used for 18-fold speed playback and the data for special playback used for quadruple-speed playback. Namely, in the SD mode, the recording rate allowable for the data for normal playback is less than or equal to 19.4 Mbps. Here, if a signal having the data rate of 20 Mbps is received, it is necessary to record the data in the 2SD mode having the recording rate of 38.8 (=19.4×2) Mbps. Thus, in this case, recordable time becomes one half the time in the standard mode, and furthermore redundancy becomes extremely large.

In addition, if the ½-SD mode is adopted, the recordable rate as the data for normal playback is 9.7 Mbps. Hence, even if, for example, an information signal having the data rate of 10 Mbps is received, only the recording in the standard mode can be performed. In this case as well, recording time cannot be lengthened due to the excessive frequency of 0.3 Mbps, and recording with excessively large redundancy is also performed.

Thus, it is a problem that recording efficiency becomes low since the recording mode is determined without alternatives according to a transmission rate.

OBJECT AND SUMMARY OF THE INVENTION

The object of the present invention is to provide a recorded signal generating apparatus capable of increasing the recording efficiency by making a plurality of recording mode s selectable according to a transmission rate.

A recorded signal generating apparatus according to the present invention comprises: transmitted signal/recorded signal conversion means for receiving a transmitted signal encoded into efficient codes, and generating and outputting a recorded signal including data for normal playback and additional data; rate information extraction means for extracting information showing a transmission rate of the transmitted signal; mode detection means for detecting a mode setup signal based on user's operation and outputting a detection signal; recording mode setup means for setting a recording mode based on information showing a transmission rate from the rate information extraction means and the detection signal; and additional data modification means for generating an additional data generation instruction signal for modifying a recording rate of the additional data based on a recording mode set by the recording mode setup means, and outputting the additional data generation instruction signal to the transmitted signal/recorded signal conversion means.

Other characteristics and merits of the present invention will become clear through the following description.

DETAILED DESCRIPTION OF THE PREFERRED EMBODIMENTS

Hereinafter, embodiments according to the present invention will be described in detail with reference to drawings.

Figure 1:
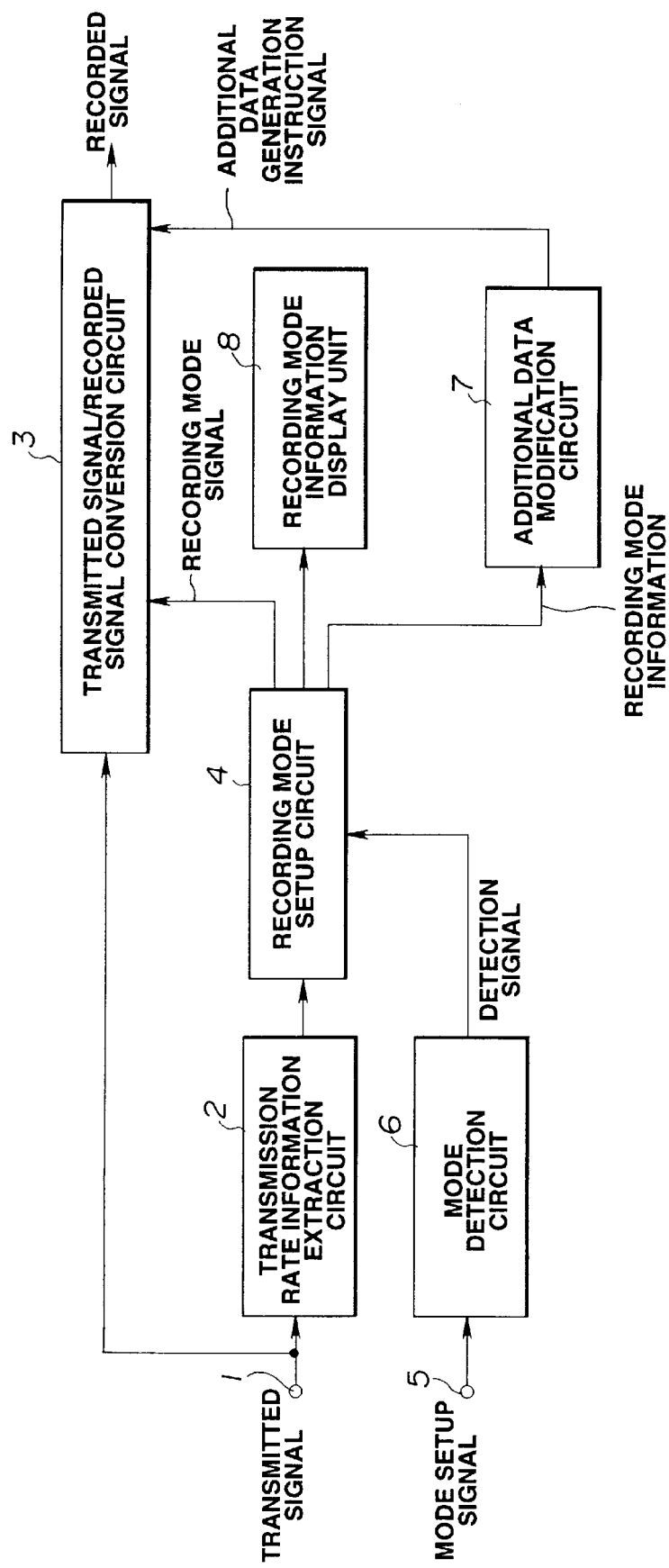
FIG. 1 is a block diagram showing an embodiment of a recorded signal generating apparatus according to the present invention.

FIG. 1 is a block diagram showing an embodiment of a recorded signal generating apparatus according to the present invention.

This embodiment is an apparatus to be applied to a VCR and the like generating and recording additional data such as data for special playback as well as data for normal playback. This embodiment can record data in a mode desired by the user by making volume of additional data varied according to a transmission rate. Namely, this embodiment generates the additional data in the mode desired by the user in consideration of priority between recording time and information volume of the additional data obtained from the rate information of a transmitted data. Further, this embodiment generates a recorded signal composed of the data for normal playback and additional data. The recorded signal generated by this embodiment is recorded in a recording system not shown. In addition, as the additional data, there are data for special playback, which are used for high-speed playback and the like, and error correction data.

In FIG. 1, a transmitted signal is inputted to the input terminal 1. This transmitted signal is processed into efficient codes, packetized, and transmitted at a predetermined transmission rate, and has information showing the transmission rate. The transmitted signal is outputted to the transmission rate information extraction circuit 2 and transmitted signal/recorded signal conversion circuit 3. The transmission rate information extraction circuit 2 extracts information showing the transmission rate included in the transmitted signal, and outputs it to a recording mode setup circuit 4.

On the other hand, a mode setup signal based on user's operation is inputted to an input terminal 5. The mode setup signal shows user's priority regarding recording modes, in which one of two modes can be designated, one of which is the normal mode in which additional data is generated at the maximum recording rate allowable to the additional data such as data for special playback and error correction data, the other of which is the longtime mode in which recording time of data for normal playback is lengthened by lowering the recording rate of the additional data. The mode detection circuit 6 receives the mode setup signal, detects whether the mode is the normal mode or longtime mode, and outputs a detection signal to the recording mode setup circuit 4.

The recording mode setup circuit 4 sets a recording mode using the information showing the transmission rate and the detection signal showing the mode designated by the user. Now, let the transmission rate of the transmitted signal that is obtained from the information of the transmission rate be Ir. Assume that, in a recording system not shown, recording of a variable rate is possible, for example, it is possible to record and play data in the SD, 2SD, ½-SD, and ¼-SD modes. Let the recording rate (standard rate) in the SD mode (standard mode) be SDr, and the recording rates in the 2SD, ½-SD, and ¼-SD modes are 2SDr, SDr/2, and SDr/4 respectively. If the user designates the normal mode, the recording mode setup circuit 4 determines the recording mode based on which of the following inequalities (1) to (4) the relation between the rate Ir and the recording rate in each recording mode satisfies.

$Ir > SDr$ (1)

$SDr/2 < Ir \leq SDr$ (2)

$SDr/4 < Ir \leq SDr/2$ (3)

$Ir \leq SDr/4$ (4)

The recording mode setup circuit 4 outputs a recording mode signal for designating the 2SD mode if the normal mode is designated and the inequality (1) holds. Similarly, the recording mode setup circuit 4 outputs: a recording mode signal for designating the SD mode if the normal mode is designated and the inequality (2) holds; a recording mode signal for designating the ½-SD mode if the inequality (3) holds; and a recording mode signal for designating the ¼-SD mode if the inequality (4) holds.

The present embodiment makes it possible to assign data for normal playback all or a part of a recording rate assigned originally to additional data in a whole recording rate in each recording mode. In the normal mode, the whole recording rate assigned to the additional data is used for the additional data as it is. On the other hand, in the longtime mode, all or a part of the recording rate assigned to the additional data is assigned to the data for normal playback. That is, if the normal mode is designated, it is possible to perform highly-functional playback using the additional data, and if the longtime mode is designated, it is possible to record the data for normal playback in long time although functions are limited.

If the user designates the longtime mode, the recording mode setup circuit 4 determines the recording mode based on which of the following inequalities (5) to (11) is satisfied, by making a data rate to be assigned to the data for normal playback in the maximum recording rate which can be assigned to the additional data be A.

$$Ir > SDr + A \quad (5)$$

$$SDr < Ir \leq SDr + A \quad (6)$$

$$(SDr+A)/2 < Ir \leq SDr \quad (7)$$

$$SDr/2 < Ir \leq (SDr+A)/2 \quad (8)$$

$$(SDr+A)/4 < Ir \leq SDr/2 \quad (9)$$

$$SDr/4 < Ir \leq (SDr+A)/4 \quad (10)$$

$$Ir \leq SDr/4 \quad (11)$$

The recording mode setup circuit 4 outputs a recording mode signal for designating the 2SD mode, SD mode, ½-SD mode, or ¼-SD mode respectively if the above inequality (5), (7), (9), or (11) holds. In addition, if a user designates the longtime mode, the recording mode setup circuit 4 outputs a recording mode signal for designating the SD' mode, ½-SD' mode, or ¼-SD' mode respectively if the above inequality (6), (8), (9), or (10) holds. In the SD' mode, ½-SD' mode, and ¼-SD' mode, only A in the rate originally assigned to the additional data is assigned to the data for normal playback.

The recording mode setup circuit 4 outputs recording mode information showing a recording mode to the additional data modification circuit 7. The additional data modification circuit 7 outputs an additional data generation instruction signal for changing the data volume of the additional data according to a recording mode to the transmitted signal/recorded signal conversion circuit 3. For example, if a user designates recording in the normal mode (2SD, SD, ½-SD, or ¼-SD mode), the additional data modification circuit 7 outputs the additional data generation instruction signal to make the additional data recorded in the whole recording rate originally assigned to the additional data. Furthermore, if a user designates recording in the SD', ½-SD', or ¼-SD' mode (hereinafter: longtime achievement mode), the circuit 7 outputs the additional data generation instruction signal to make the additional data recorded in the recording rate which is small by the data rate A. Still further, if a user designates the 2SD mode, SD mode, ½-SD mode, or ¼-SD mode, the additional data modification circuit 7 can output the additional data generation instruction signal to make the additional data recorded in the rate which is the result of addition of the data rate allocatable to additional data in the recording rate originally assigned to the data for normal playback. In addition, even in this case, the data for special playback cannot be used as the additional data to be recorded in recording areas of the data for normal playback.

A recording mode signal from the recording mode setup circuit 4 is also supplied to a VCR not shown as a recording system, and is used for system control such as tape speed.

Figure 2:
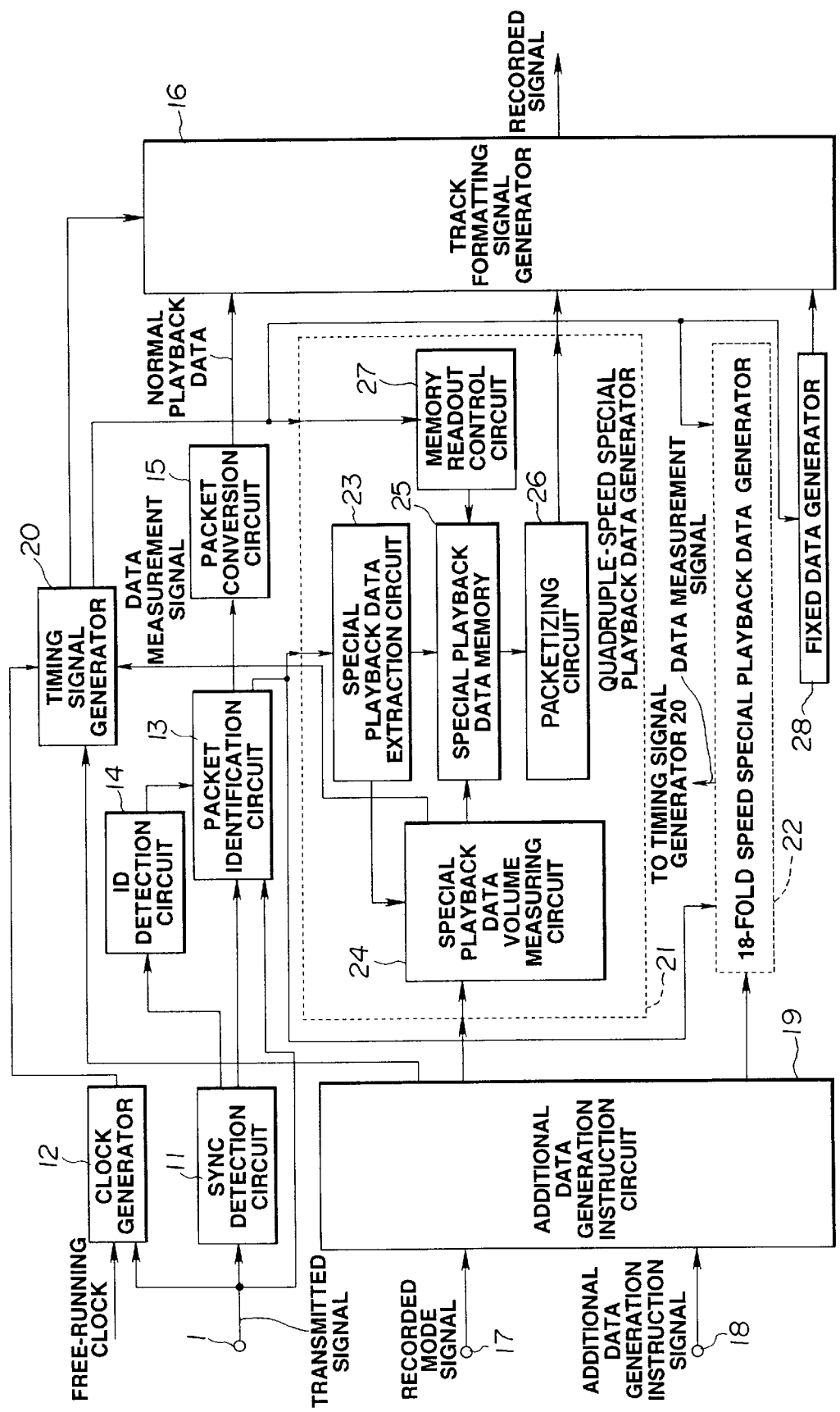
FIG. 2 is a block diagram showing a concrete construction of the transmitted signal/recorded signal conversion circuit 3 shown in FIG. 1.

FIG. 2 is a block diagram showing a concrete construction of the transmitted signal/recorded signal conversion circuit 3 shown in FIG. 1. FIG. 2 shows an example to generate data for special playback used for quadruple-speed and 18-fold speed playback as the data for special playback among additional data.

A transmitted signal inputted through an input terminal 1 is supplied a sync detection circuit 11, clock generator 12, and packet identification circuit of the transmitted signal/recorded signal conversion circuit 3. The sync detection circuit 11 detects a sync signal from the transmitted signal, and outputs the sync signal to the packet identification circuit 13 and an ID detection circuit 14. The ID detection circuit 14 detects an ID signal that indicates a data sort of a packet included in the transmitted signal, and outputs it to the packet identification circuit 13. For example, if the transmitted signal is encoded conforming to the MPEG2 standard, a packet is a transport packet in a transport stream, whose unit length is 188 bytes. It is possible to identify whether the packet is a video packet, audio packet, sub-cord, or conditional access code.

The packet identification circuit 13 not only divides a packet according to a sync signal located at the top of the packet, but also identifies a data sort of the packet using the ID signal. The packet identification circuit 13 not only outputs the data to be recorded to a packet conversion circuit 15, but also outputs an identified video packet to a special playback data extraction circuit 23 in each of a quadruple-speed special playback data generator 21 and 18-fold speed special playback data generator 22. The packet conversion circuit 15 converts inputted data into a packet suitable to a recording format on a recording medium, and outputs the packet to a track formatting signal generator 16 as data for normal playback.

The clock generator 12 receives a free-running clock from a free-running clock generator not shown. The clock generator 12 can regenerate a clock from a transmitted signal, and hence, selecting the free-running clock or a regenerated clock, the generator 12 outputs it to a timing signal generator 20. For example, if a transmitted signal is not inputted as in playback, the clock generator 12 outputs the free-running clock, and, if a transmitted signal is inputted as in recording, the generator 12 outputs the regenerated clock.

Input terminals 17 and 18 receives a recording mode signal and an additional data generation instruction signal respectively. The recording mode signal and additional data generation instruction signal are supplied to an additional data generation instruction circuit 19. The additional data generation instruction circuit 19, based on the recording mode signal and additional data generation instruction signal, obtains a data rate of the additional data to be recorded, that is, generated volume of the data for special playback used for the quadruple-speed playback and 18-fold speed playback. After that, the circuit 19 outputs the volume data to the quadruple-speed special playback data generator 21 and 18-fold speed special playback data generator 22. In addition, the additional data generation instruction circuit 19 further outputs information showing a recording mode to the timing signal generator 20.

Corresponding to the instruction of the additional data generation instruction circuit 19, the quadruple-speed special playback data generator 21 generates data for special playback used for quadruple-speed special playback from a video signal in the video packet, and outputs it to the track formatting signal generator 16. Corresponding to the instruction of the additional data generation instruction circuit 19, the 18-fold speed special playback data generator 22 generates data for special playback used for 18-fold speed special playback from a video signal in the video packet, and outputs it to the track formatting signal generator 16.

Figures 3A, 3B:
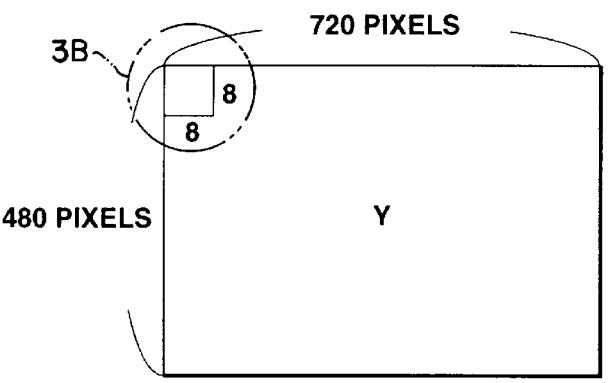
FIGS. 3A and 3B are explanatory drawings for explaining extraction of data for special playback.

Thus, the special playback data extraction circuit 23 in the quadruple-speed special playback data generator 21 extracts data for special playback from the inputted video packet. In the MPEG2 standard, a transmitted signal is encoded, for example, by the block of 8×8 pixels into predictive codes using two-dimensional DCT (Discrete Cosine Transform). FIG. 3A shows blocking by the 8×8 pixels. Performing the two-dimensional DCT to each block, a DCT coefficient, as shown in FIG. 3B, is expressed in 64 frequency components, which are arrayed vertically and horizontally from a low frequency band to a high frequency band in 8×8 pieces (FIG. 3B). In this case, the special playback data extraction circuit 23 can extract low frequency band components of the DCT coefficient of data encoded within a frame as the data for special playback used for quadruple-speed playback. For example, the special playback data extraction circuit 23 extracts the coefficients from direct current data to the fifth of alternating current component which are components of the DCT coefficient of the data encoded within the frame. The special playback data extraction circuit 23 corrects the extracted data to standardize a set of the data, and outputs them to a special playback data volume measuring circuit 24 and special playback data memory 25. In addition, in the MPEG2 standard, variable-length coding is adopted. Hence, after the special playback data extraction circuit 23 performs variable-length decoding to a part or all of the inputted data, it extracts the data for special playback. The special playback data extraction circuit 23 outputs information on data length of the extracted variable-length data to the special playback data volume measuring circuit 24. In addition, processing of the data for special playback is described in Japanese Patent Laid-Open No. 5-276480, entitled "Magnetic recording and playback apparatus" in detail.

The special playback data memory 25 stores the inputted data for special playback. The special playback data volume measuring circuit 24 measures the data length of the data for special playback from the inputted information. Further, the circuit 24, based on the instruction about generated volume of the data for special playback from the additional data generation instruction circuit 19, determines whether the data for special playback is kept in the special playback data memory 25. By outputting a write signal to the special playback data memory 25, the special playback data volume measuring circuit 24 instructs the special playback data memory 25 to record the data. The special playback data volume measuring circuit 24 outputs to the timing signal generator 20 a data measurement signal showing the data volume already written in the special playback data memory 25.

The memory readout control circuit 27 is given readout timing of the data for special playback by the below-described timing signal generator 20, and reads the data stored in the special playback data memory 25 to output the data to a packetizing circuit 26. The packetizing circuit 26, based on the recording format, packetizes the inputted data for special playback to output the data to the track formatting signal generator 16. For example, the packetizing circuit 26 generates a transport packet conforming to the MPEG2 standard.

The construction of the 18-fold speed special playback data generator 22 is the same as that of the quadruple-speed special playback data generator 21. That is, the circuit 22 generates data for special playback used for 18-fold speed special playback to packetize it, and outputs it to the track formatting signal generator 16. A fixed data generator 28 generates a predetermined fixed data as dummy data so as to make the format of a recording signal coincided with the predetermined recording format to output it to the track formatting signal generator 16.

The timing signal generator 20 operates based on a clock from the clock generator 12, constructs the recording format according to information on a recording mode. Further, the generator 20 generates a timing signal so as to determine data arrangement based on the data measurement signal to output it to the track formatting signal generator 16. In addition, the timing signal generator 20 controls the quadruple-speed special playback data generator 21, 18-fold speed special playback data generator 22, and fixed data generator 28 to let them read data for special playback used for quadruple-speed special playback, data for special playback used for 18-fold speed special playback, or fixed data according to the recording format. After that, the generator 20 makes it outputted to the track formatting signal generator 16.

The track formatting signal generator 16 is controlled by the timing signal generator 20 to switch the data for normal playback, data for special playback used for quadruple-speed special playback, data for special playback used for 18-fold speed special playback, or fixed data, and outputs it as a recorded signal.

In FIG. 1, the output of the recording mode setup circuit 4 is also given to a recording mode information display unit 8. The recording mode information display unit 8 can display expression showing the recording mode on a display screen not shown.

Figure 4:
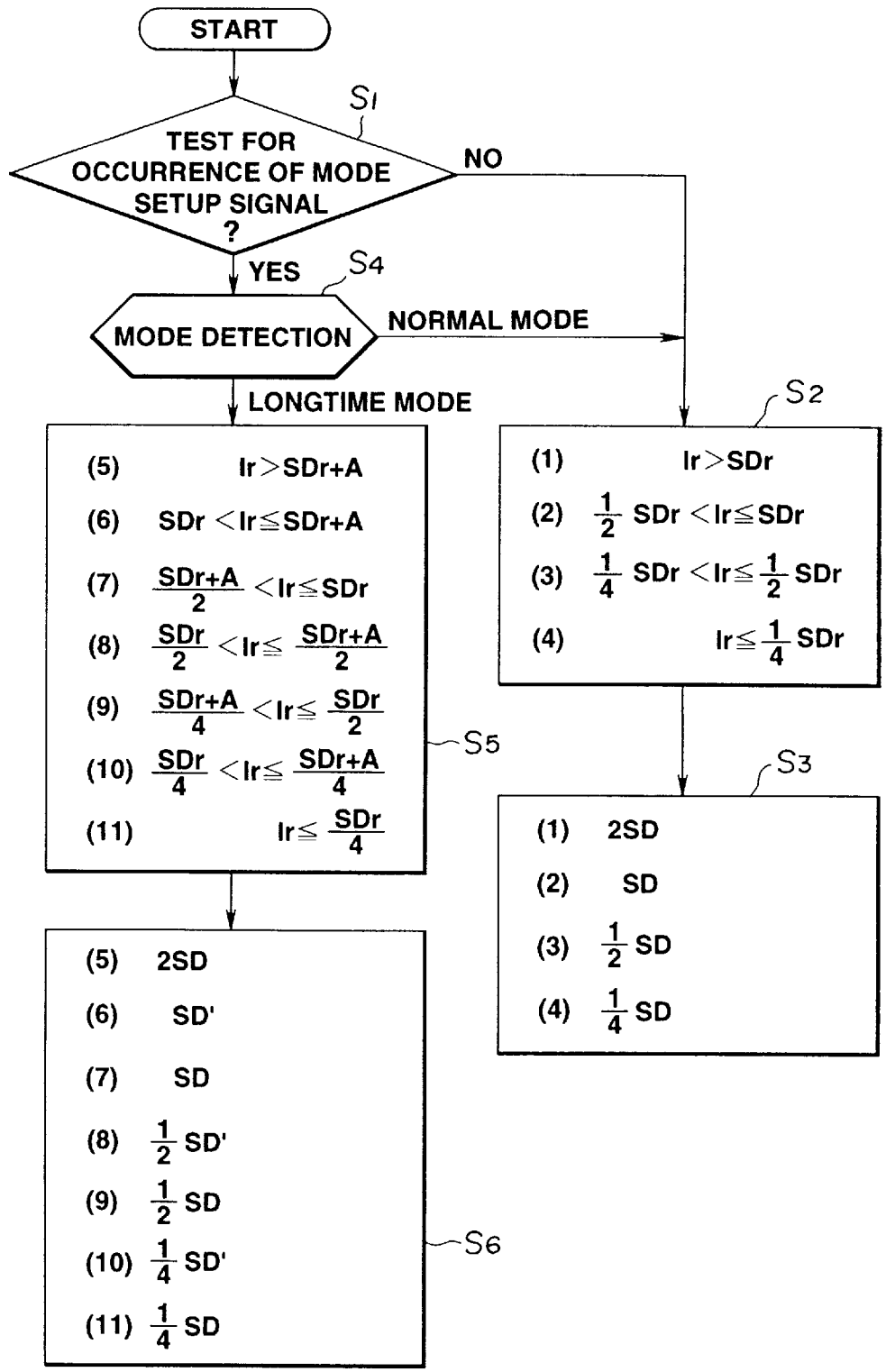
FIG. 4 is a flow chart for explaining operation of the embodiment.

Next, operation of an embodiment constructed in this manner will be described below with reference to FIG. 4. FIG. 4 is a flow chart for explaining the operation of the embodiment. In FIG. 4, processing in cases (1) to (11) at steps S2 and S5 corresponds to that in cases (1) to (11) at steps S3 and S6.

A transmitted signal encoded into efficient codes is supplied to the transmission rate information extraction circuit 2 through the input terminal 1. The transmission rate information extraction circuit 2 extracts information showing a transmission rate from the transmitted signal to output it to the recording mode setup circuit 4. The recording mode setup circuit 4 compares the transmission rate Ir of the transmitted signal with the recording rate in each recording mode in the recording system. Now, assume that a user does not designate a recording mode. In this case, the process goes from step S1 to step S2 to run the normal mode.

Here, assume that, in the SD mode in the recording system, the whole recording rate is 25 Mbps, and the recording rate of the data for normal playback is 19.4 Mbps. Therefore, the recording rate of the data for normal playback in the ½-SD mode is 9.7 Mbps. Let the transmission rate Ir be 10 Mbps, the recording mode setup circuit 4 detects that the above inequality (2) shown in the case (2) at step S2 holds. Then, the recording mode setup circuit 4 sets the SD mode shown in the case (2) at step S3. The recording mode setup circuit 4 outputs a recording mode signal for designating the SD mode to the transmitted signal/recorded signal conversion circuit 3 and recording mode information display unit 8. At the same time, the circuit 4 outputs the recording mode information to the additional data modification circuit 7.

The additional data modification circuit 7 outputs the additional data generation instruction signal for making the additional data recorded in the whole recording rate (5.6 Mbps), which is originally assigned to the additional data, to the transmitted signal/recorded signal conversion circuit 3. In addition, the additional data modification circuit 7 can assign the residual rate, 9.4 Mbps in the recording rate originally assigned to the data for normal playback, to additional data, for example, error correction codes.

The transmitted signal inputted through the input terminal 1 is given to the packet identification circuit 13 after a sync signal is detected by a sync detection circuit 11 in the transmitted signal/recorded signal conversion circuit 3. The packet identification circuit 13 identifies the data sort of a packet using an ID code detected by the ID detection circuit 14 to give the video packet to the quadruple-speed special playback data generator 21 and 18-fold speed special playback data generator 22. The packet conversion circuit 15 converts the output of the packet identification circuit 13 into a packet suitable to the recording format to output it to the track formatting signal generator 16 as the data for normal playback.

On the other hand, the recording mode signal showing the SD mode is inputted to the additional data generation instruction circuit 19, and the additional data generation instruction signal is also inputted, the signal showing assignment of the recording rate, 5.6 Mbps to the additional data. The additional data generation instruction signal transfers information on data volume assigned to the data for special playback used for quadruple-speed special playback and information on data volume assigned to the data for special playback used for 18-fold speed special playback, which are shares of the recording rate, 5.6 Mbps assigned to the additional data, respectively to the special playback data volume measuring circuits 24 in the quadruple-speed special playback data generator 21 and 18-fold speed special playback data generator 22.

The special playback data extraction circuit 23 decodes a part or all of the variable-length codes of the video packet, extracts the low frequency components of the DCT coefficient in the data encoded within a frame, and packetizes them according to the recording format to output it to the special playback data memory 25. In addition, the special playback data extraction circuit 23 outputs information on the data length of the outputted data for special playback to the special playback data volume measuring circuit 24. The special playback data volume measuring circuit 24 writes the data for special playback in the special playback data memory 25 by generating a write signal if the volume of the data to be written in the special playback data memory 25 does not exceed the assigned code volume. If it does, the circuit 24 forbids writing. In this manner, the data for special playback is stored within the assigned code volume in the special playback data memory 25.

Furthermore, the recording mode information is given from the additional data generation instruction circuit 19 to the timing signal generator 20. The timing signal generator 20 constructs a recording format according to the recording mode, generates a timing signal for arranging data based on the data measurement signal outputted from the quadruple-speed special playback data generator 21 and 18-fold speed special playback data generator 22 to output it to the track formatting signal generator 16. In addition, under the control of the timing signal generator 20, the data for special playback that is stored in the special playback data memory 25 is read and packetized by the packetizing circuit 26, and is given to the track formatting signal generator 16.

Figure 12:
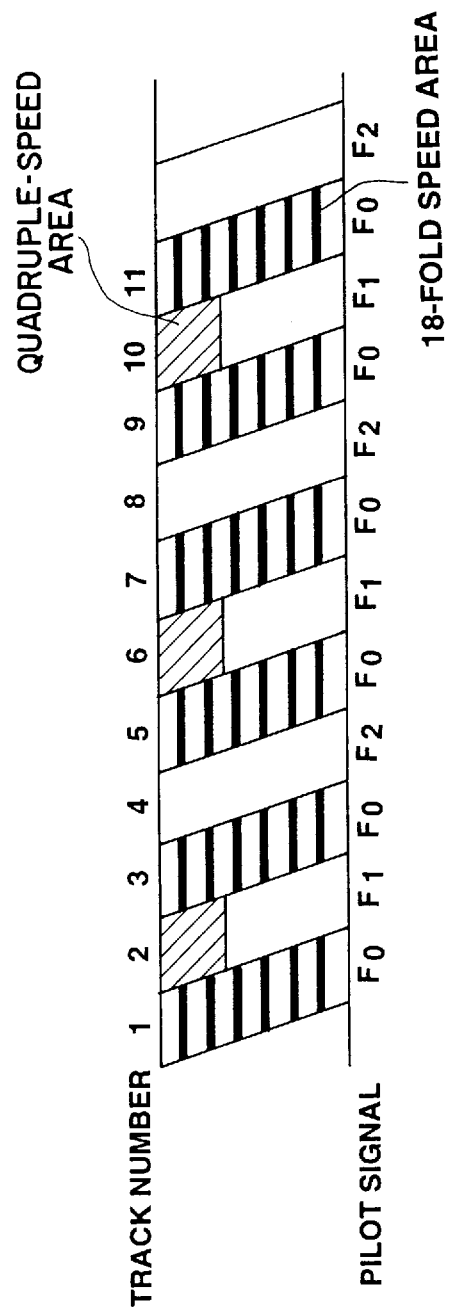
FIG. 12 is an explanatory drawing showing in detail the transmitted data area shown in FIG. 11.

The track formatting signal generator 16 selects one of the data for normal playback given from the packet conversion circuit 15, data for special playback used for quadruple-speed special playback that is given by the quadruple-speed special playback data generator 21, data for special playback used for 18-fold speed special playback that is given by the 18-fold speed special playback data generator 22, and fixed data from the fixed data generator 28 to output it as a recorded signal. In this manner, in this case, by supplying the recorded signal to a VCR and recording it in the SD mode on a magnetic tape, for example, record tracks shown in FIG. 12 are formed. Moreover, the recording mode information display unit 8 display expression showing the SD mode on a screen.

Since the data for special playback used for quadruple-speed special playback and 18-fold speed special playback is recorded, a user can see these special playback images besides normal playback images. In addition, since it is possible to record additional data except the data for special playback in the area originally assigned to the data for normal playback, for example, it is possible to achieve increase of error correction capability and various functions. However, recording time in the normal mode is the same as that in conventional examples.

When the mode setup signal is inputted based on user's mode setting, the mode setup circuit 6 detects that the mode setup signal is inputted, and moves the process to step S4. The mode setup circuit 6 detects using the mode setup signal whether the normal mode or longtime mode is designated to output a detection signal to the recording mode setup circuit 4.

If a user designates the normal mode, the process goes to step S3, and the process similar to the case that the user does not designate the mode is performed. That is, in this case, the SD mode is designated, and the whole rate of 5.6 Mbps that is assigned to additional data is used for generation of the additional data.

Here, assume that a user designates the longtime mode. The mode setup signal based on this mode setting is detected by the mode detection circuit 6, and a detection signal is given to the recording mode setup circuit 4. Now, assume that a data rate used for recording the data for normal playback in the data rate originally assigned to the additional data, namely, data rate A included in the above inequalities (5) to (11) is larger than 0.6 Mbps. In this case, the above inequality (8) shown in the case (8) at step S5 holds.

Thus, the recording mode setup circuit 4 sets the ½-SD' mode at step S6. The recording mode signal indicating the ½-SD' mode is given to the transmitted signal/recorded signal conversion circuit 3 and recording mode information display unit 8, and the recording mode information is given to the additional data modification circuit 7. The additional data modification circuit 7 outputs the additional data generation instruction signal showing that the data rate to be assigned to the additional data is (5.6/2)–A/2.

The additional data generation instruction circuit 19 in the transmitted signal/recorded signal conversion circuit 3 outputs information showing the ½-SD' mode to the timing signal generator 20. In addition, the additional data generation instruction circuit 19 obtains the data rate to be assigned to the quadruple-speed special playback data generator 21 and 18-fold speed special playback data generator 22, which are shares of the data rate assigned to the additional data. Further, the circuit 19 outputs the volume information of data to be generated to the special playback data volume measuring circuit 24.

The special playback data volume measuring circuit 24 in each of the quadruple-speed special playback data generator 21 and 18-fold speed special playback data generator 22 controls writing in the special playback data memory 25 lest the data volume does not exceed the assigned code volume. In the same time, the circuit 24 outputs the data measurement signal indicating the data volume written in the special playback data memory 25 to the timing signal generator 20. The timing signal generator 20 generates the timing signal corresponding to the ½-SD' mode to output it to the track formatting signal generator 16. Simultaneously, the circuit 20 reads the data for special playback from the quadruple-speed special playback data generator 21 and 18-fold speed special playback data generator 22 by controlling the memory readout control circuit 27 to make the fixed data, which is used as dummy data, outputted.

That is, in this case, the recording mode is the same as that in the ½-SD mode, and the timing signal is generated so that the data for normal playback may be arranged only in the data rate of A/2 at the arrangement position corresponding to the recording area of the data for special playback in the ½-SD mode.

The track formatting signal generator 16 is controlled by the timing signal, and switches the data for normal playback, data for special playback used for quadruple-speed special playback, data used for 18-fold speed special playback, and fixed data to output it as a recorded signal. In addition, the recording mode information display 8 displays expression indicating the ½-SD' mode.

In this manner, in this case, if the longtime mode is designated, the recording rate of the additional data, for example, recording rate of the data for special playback becomes small. Therefore, although there is a possibility that picture quality of special playback images using the data for special playback deteriorates, recording time of normal playback images can be doubled.

In this manner, in this embodiment, it is possible to set an optimum recording mode to perform longtime recording by making the recording rate of the additional data variable, and enabling the data rate, which is originally assigned to the additional data, possible to be assigned to the data for normal playback. Moreover, since mode setting is determined based on user's mode setting, it is possible to generate a recorded signal capable of recording in the mode desired by the user.

In addition, in this embodiment, an example is described, the example in which the data rate is set as A which is possible to be assigned to the data for normal playback in the recording rate of the additional data. However, it is apparent that recording efficiency can be further increased by making the sort of the data rate, capable of being assigned, a plurality of sorts to diversify the recording mode to be set.

Figure 5A:
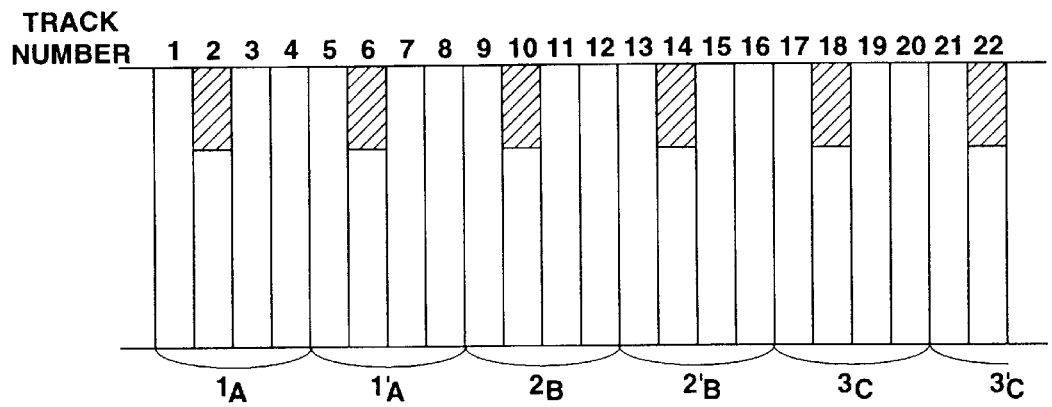
FIGS. 5A to 5C are explanatory drawings for explaining recording in recording areas of data for special playback.
Figure 5B:
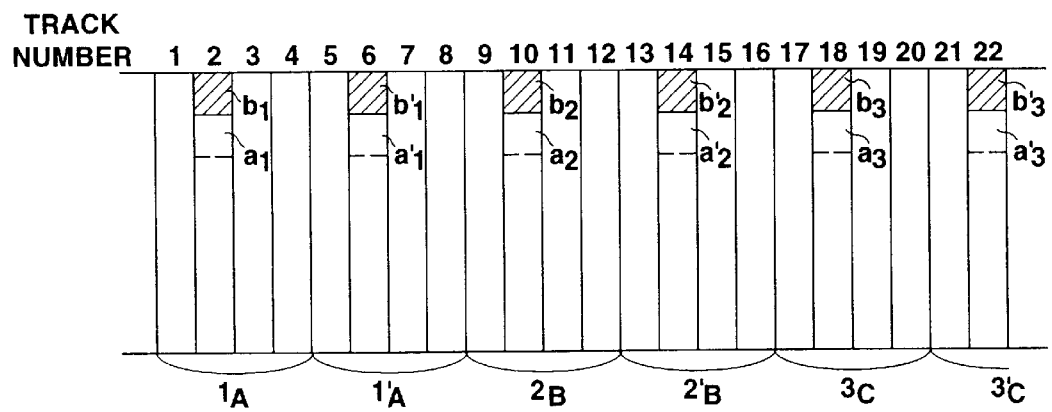
Figure 5C:
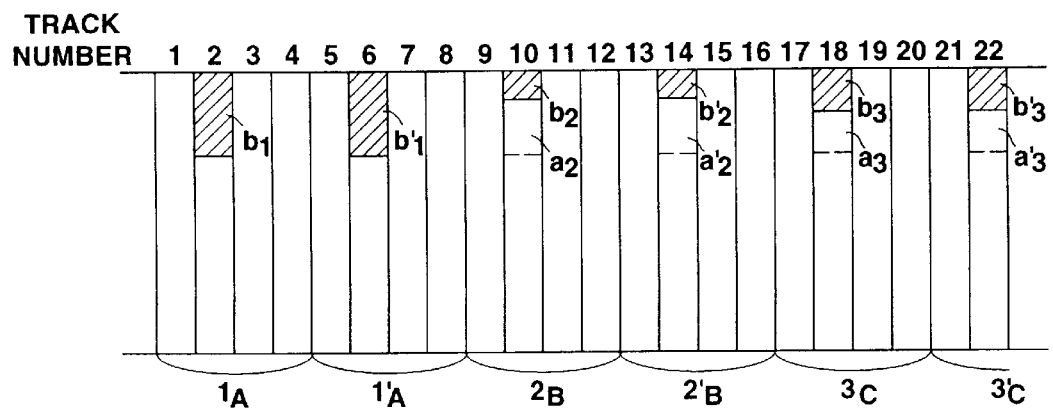
Figure 6:
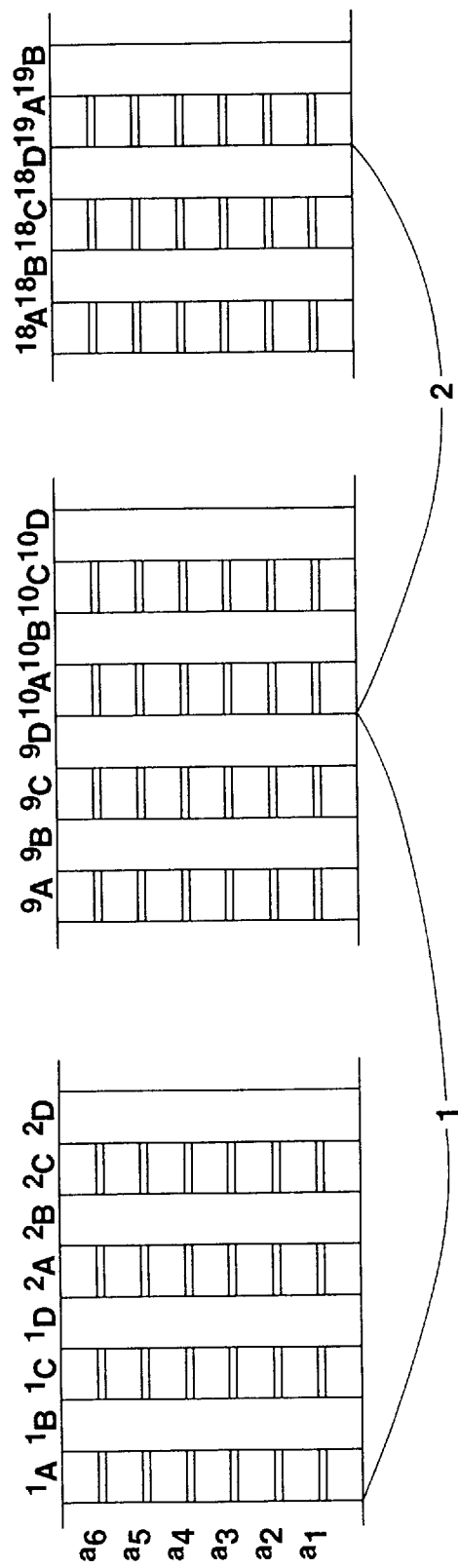
FIG. 6 is a explanatory drawing for explaining recording in recording areas of data for special playback.

FIGS. 5A to 5C, and 6 are explanatory drawings for explaining data for normal playback which is assigned to the recording area of the additional data and recorded. FIG. 5A shows quadruple-speed areas recording data for special playback used for quadruple-speed playback in the normal mode as diagonally shaded areas. FIGS. 5B and 5C show quadruple-speed areas in the longtime achievement mode as diagonally shaded areas. Furthermore, FIG. 6 shows 18-fold speed areas recording data for special playback used for 18-fold speed playback in the normal mode.

The quadruple-speed area in the normal mode, as shown in FIG. 5A, is formed on a part of an upper end area of a track per four tracks. Doc. 2 described above proposes that a pilot signal is recorded at intervals of four tracks to make tracking phases coincide with F0 tracks at intervals of two tracks. Therefore, two tracking phases can be exist which are shifted by two tracks. For this reason, Doc. 2 proposes to record the same data twice per four tracks. Thus, the data for special playback recorded in the recording area of the data for special playback in the first to fourth tracks are recorded again in the recording area of the data for special playback in the fifth to eighth tracks. Codes 1A, 1A', codes 2B, 2B', and codes 3C, 3C' shown in FIGS. 5A to 5C shows pairs of the tracks where the same data are recorded.

FIG. 5B shows an example in which a half of each of quadruple-speed areas in the normal mode is assigned to recording areas of the data for normal playback. In this case, the same data should be recorded in each pair of paired areas shown by codes 1A, 1A', codes 2B, 2B', and codes 3C, 3C'. Thus, each pair of the data for special playback b1 and b1', data for special playback b2 and b2', . . . are the same data. Further, each pair of the data for normal playback a1 and a1', data for normal playback b1 and b1' are the same data.

FIG. 5C shows an example in which the data for special playback is recorded together over the predetermined interval of track count. The data encoded within a frame having high possibility of being used as the data for special playback is periodically generated per predetermined frame count. Therefore, by recording the data for special playback together at this interval, memory capacity can be reduced. FIG. 5C shows a case that this is considered. Thus, the data for special playback is recorded together in all recording areas of the data for special playback, and the data for special playback b2, b2' and data for normal playback a2, a2' are recorded on the tracks shown by codes 2B and 2B'.

A ratio between the capacity of the data for special playback in the original recording areas of the data for special playback and capacity of the data for normal playback differs every track. In addition, in the SD standard, data is recorded by the sync block. Therefore, in the packet conversion circuit 15 shown in FIG. 2, packet conversion is performed by assigning two packets to five sync blocks due to difference between packet length of a transport packet conforming to the MPEG2 standard and length of the sync block. Hence, in this case, the ratio between the capacity of the data for special playback and capacity of the data for normal playback changes every five sync blocks.

The 18-fold speed areas in the normal mode, as shown in FIG. 6, are formed at six positions on a track every other track. In this case, because of 18-fold speed playback, the same data should be recorded while nine four-track cycles that each are the cycle of the pilot signals pass. Thus, the same data are recorded twice every four tracks, and hence, the same data are recorded over a cycle of 18 tracks.

Although, in FIGS. 5A to 5C, the example is described in which the data for normal playback is assigned to the recording areas of the data for special playback, it is apparent that, if ECC3 areas and audio areas are also usable, these areas can be assigned to the data for normal playback for recording. In this case, the timing signal generator 20 can output a timing signal so that recording may be performed in these areas.

Furthermore, in the above-described embodiment, although the date rate allocatable the data for normal playback is fixed, it is possible to let the data rate allocatable to the data for normal playback be variable according to the data rate of a transmitted signal.

Figure 7:
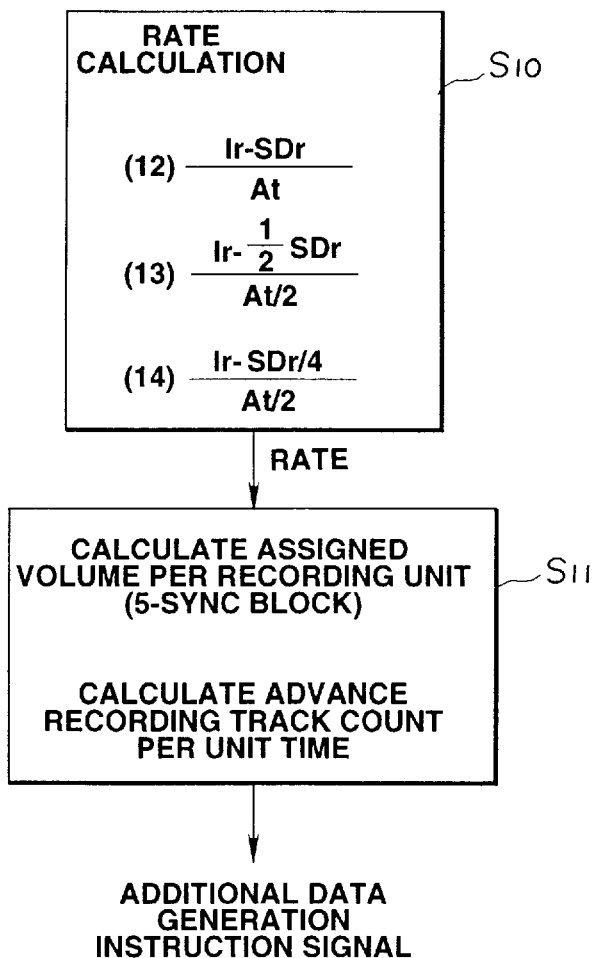
FIG. 7 is a flow chart for explaining operation of another embodiment according to the present invention.

FIG. 7 is a flow chart showing another embodiment for explaining operation of an additional data modification circuit.

Only the structure of the additional data modification circuit in the present embodiment is different from that in FIG. 1. In the additional data modification circuit 7 in FIG. 1, A (in the SD mode) is defined as the data rate to be assigned to the data for normal playback, the data rate which is a share of the recording rate of the additional data. On the other hand, in FIG. 7, the data rate to be assigned to the data for normal playback, the data rate which is a share of the recording rate of the additional data, is made to be variable. Further, the ratio between the maximum recording rate At capable of being assigned to the additional data and the data rate to be assigned to the data for normal playback is calculated.

That is, the additional data modification circuit performs ratio calculation shown below in inequalities (12) to (14) at step S10 in FIG. 7.

$$(Ir-SDr)/At \tag{12}$$

$$(Ir-SDr/2)/At/2 \tag{13}$$

$$(Ir-SDr/4)/At/4 \tag{14}$$

The above inequality (12) expresses the ratio of the data rate to be assigned to the data for normal playback in the maximum recording rate assigned to the additional data in the SD mode. Similarly, inequalities (13) and (14) express data rates to be assigned to the data for normal playback in the ½-SD mode and ¼-SD mode respectively. Calculation results of inequalities (12) to (14) should be less than 1. Thus, at step S10, if the calculation result in the case (14) is larger than 1, the case (13) should be evaluated, and, if the calculation result in the case (13) is larger than 1, the case (12) should be evaluated.

In the SD standard, as shown above, two packets are assigned to five sync blocks for packet conversion. In consideration of this, the additional data modification circuit, at step S11, calculates the assigned recording rate by making five sync blocks a unit using the ratio obtained at step S10.

In addition, as shown in FIG. 5C, in consideration of the case that the recording areas assigned to the data for normal playback are gathered together by the predetermined cycle unit, the additional data modification circuit, at step S11, calculates the track count (advanced record track count) where the data for normal playback are recorded together.

The additional data modification circuit 7 outputs the information calculated at step S11 as the additional data generation instruction signal to the transmitted signal/ recorded signal conversion circuit 3.

In this manner, in this embodiment, the data rate assigned to the data for normal playback in the recording rate of the additional data is made to be variable, and hence, this embodiment has a merit to further increase recording efficiency.

Figure 8:
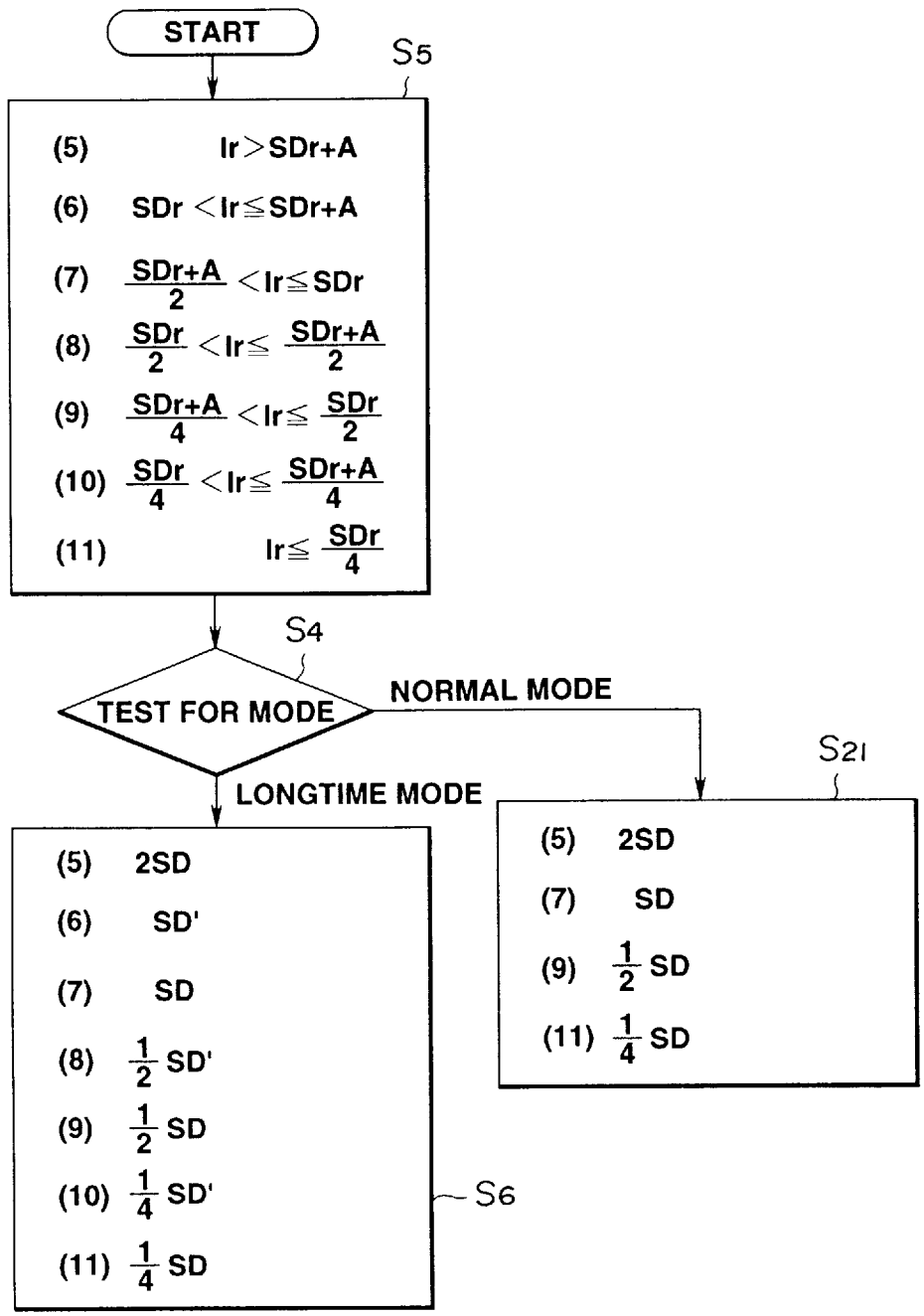
FIG. 8 is a flow chart for explaining operation of another embodiment according to the present invention.

FIG. 8 is a flow chart showing another embodiment according to the present invention for explaining operation of a recording mode setup circuit.

Only the structure of the recording mode setup circuit in the present embodiment is different from that in FIG. 1. In the recording mode setup circuit 4 shown in FIG. 1, the recording mode is set after detecting whether a user designates the normal mode or longtime mode. On the other hand, the recording mode setup circuit in the present embodiment, as shown in FIG. 8, classifies the recording mode corresponding to the longtime mode at step S5. Here, if a user designates the longtime mode, the recording mode setup circuit moves the process from step S4 to step S6 to set the recording mode.

On the other hand, if a user designates the normal mode, the process goes from step S4 to step S21. At step S21, only the cases (5), (7), (9), (11) can be selected in the classification at step S5. Thus, in this time, cases (6), (8), and (10) cannot be selected, and hence, only the recording modes selectable in the normal mode are selected. Consequently, the processing similar to steps S2 and S3 is executed.

Other actions and effects in the present embodiment are similar to the embodiment shown in FIG. 1.

Figure 9:
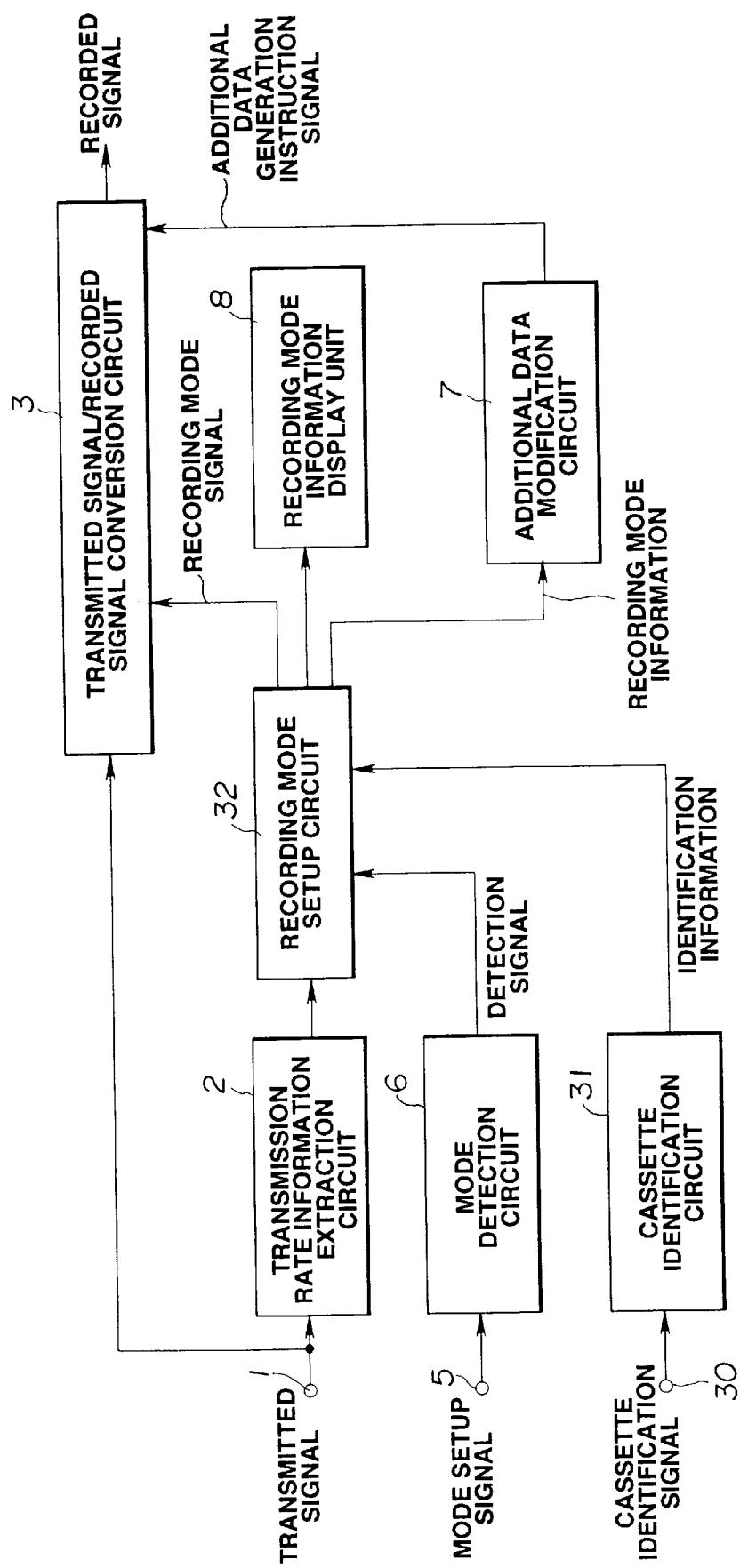
FIG. 9 is a block diagram showing another embodiment according to the present invention.
Figure 11:
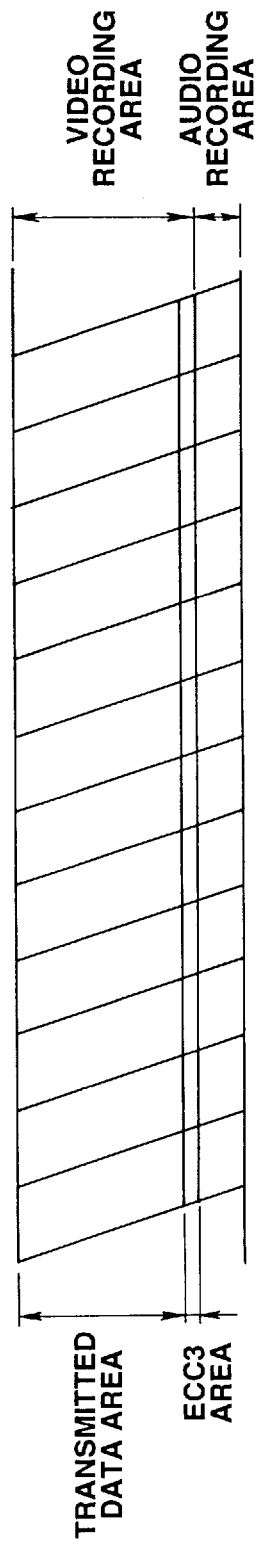
FIG. 11 is an explanatory drawing for explaining a recording format of a magnetic tape standardized in the HD-DVCR Conference.

FIG. 9 is a block diagram showing another embodiment. In FIG. 9, same elements have the same codes as those in FIG. 1 for omission of duplicated explanation.

The present embodiment is different from the embodiment shown in FIG. 1 at the points of adding a cassette identification circuit 31 and adopting a recording mode setup circuit 32 instead of the recording mode setup circuit 4. It is possible to use a cassette tape as a record media in the recording system. Recording time of a cassette tape is different by a sort of the cassette tape. When the cassette identification circuit 31 receives a cassette detection signal through a terminal 30, the circuit 31 identifies the sort of the cassette tape to output identification information such as recordable time to the recording mode setup circuit 32.

Further, the cassette identification circuit 31 can determine the sort of a cassette tape sensing positions of holes formed in the cassette tape. Furthermore, instead of the cassette identification circuit, a user can input information showing the sort of a cassette tape. In addition, using a memory-in-cassette where memory is added to the cassette, identification information can be read.

The recording mode setup circuit 32 sets a recording mode based on information showing a rate of a transmitted signal, a detection signal showing the recording mode designated by a user, and the identification information, and outputs a recording mode signal. In addition, the recording mode setup circuit 32 calculates recordable time in each mode.

Figure 10:
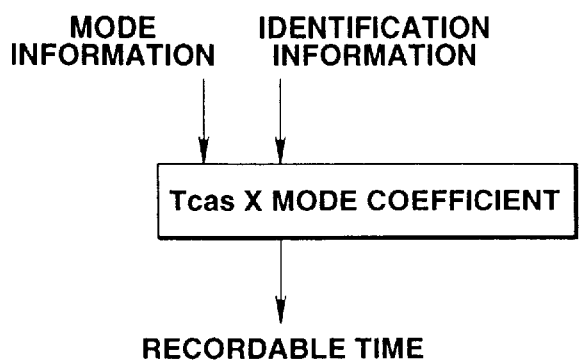
FIG. 10 is an explanatory drawing for explaining operation of the recording mode setup circuit 32 shown in FIG. 9.

FIG. 10 is an explanatory drawing for explaining calculation of recordable time in each mode in the recording mode setup circuit 32.

As shown in FIG. 10, the recording mode setup circuit 32 multiplies the recordable time $T_{CAS}$ based on the identification information of a cassette tape by a mode coefficient. The mode coefficients are ½ in the 2SD mode, 2 in the ½-SD and ½-SD' modes, and 4 in the ¼-SD and ¼-SD' modes. For example, let the recordable time $T_{CAS}$, in the SD mode be 4.5 hours, the recordable time in the ¼-SD' mode is 18 hours.

The recording mode setup circuit 32 outputs the information showing the recordable time of a cassette tape with a set recording mode signal to the recording mode information display 8. By means of this, it is possible to display the information of recordable time in the set mode besides the recording mode on a display screen of the recording mode information display 8.

In the embodiment constructed like this, when the cassette detection signal is inputted, the cassette identification circuit 31 determines the sort of the cassette tape to calculate recordable time. The cassette identification circuit 31 outputs the information of recordable time as identification information to the recording mode setup circuit 32.

The recording mode setup circuit 32 sets a recording mode using the information showing the rate of a transmitted signal and the detection signal based on user's mode setup operation. Further, the recording mode setup circuit 32 sets the recording mode also with the identification information of a cassette tape. For example, if the recordable time of a cassette tape is shorter than the time of the program to be recorded, the circuit 32 changes the recording mode so that all of the data for normal playback in the program to be recorded can be recorded.

In this manner, the present embodiment has a merit that an optimum recording mode can be set automatically according to the sort of a cassette tape.

In the present invention, it is apparent that it is possible to construct embodiments different in a wide range according to the present invention without departing from the sprit and scope thereof. The scope of the present invention should not limited to the embodiments described, and should instead be defined by the accompanying claims.

What is claimed is:

1. A recorded signal generating apparatus comprising:

transmitted signal/recorded signal conversion means for receiving a transmitted signal encoded into efficient codes, and generating and outputting a recorded signal including data for normal playback and additional data;

rate information extracting means for extracting information showing a transmission rate of said transmitted signal;

mode detection means for detecting a mode setup signal based on user's operation, and outputting a detection signal;

recording mode setup means for setting a recording mode based on information showing the transmission rate from said rate information extracting means and said detection signal; and additional data modification means for generating an additional data generation instruction signal for modifying a recording rate of said additional data on the basis of the recording mode set by said recording mode setup means, and outputting the additional data generation instruction signal to said transmitted signal/recorded signal conversion means.

2. A recorded signal generating apparatus according to claim 1, wherein said recording mode setup means sets one of recording modes that are a plurality of recording modes in a normal mode in which a recording rate of said recorded signal is changed without changing a ratio of a recording rate of said data for normal playback and a recording rate of said additional data, and a plurality of recording modes in a longtime achievement mode in which a recording rate of said recorded signal is modified and a ratio of a recording rate of said data for normal playback and a recording rate of said additional data is also modified.

3. A recorded signal generating apparatus according to claim 2, wherein, if a recording mode in said longtime achievement mode is set, said additional data modification means decreases a recording rate of said additional data, and increases a recording rate of said data for normal playback.

4. A recorded signal generating apparatus according to claim 2, wherein said additional data modification means varies a ratio of a recording rate of said data for normal playback and a recording rate of said additional data according to said normal mode and said longtime achievement mode, said ratio according to said normal mode and said ratio according to said longtime achievement mode being fixed respectively.

5. A recorded signal generating apparatus according to claim 2, wherein said additional data modification means varies a ratio of a recording rate of said data for normal playback and a recording rate of said additional data based on said transmission rate.

6. A recorded signal generating apparatus according to claim 2, wherein, if a transmission rate of said transmitted signal is larger than a recording rate in a predetermined recording mode and less than or equal to a sum of the recording rate in the predetermined recording mode and the maximum recording rate of said additional data, said recording mode setup means sets a recording mode as said longtime achievement mode.

7. A recorded signal generating apparatus according to claim 2, wherein said recording mode is a recording mode in a magnetic recording and playback apparatus using a magnetic tape as a recording media, and said additional data includes data for special playback.

8. A recorded signal generating apparatus according to claim 7, wherein said transmitted signal/recorded signal conversion means generates said recorded signal so as to make said data for special playback recorded in recording areas of data for special playback on said magnetic tape that is traced when said magnetic recording and playback apparatus performs special playback, and said additional data modification means modifies a recording rate of said data for normal playback and a recording rate of said additional data so as to make said data for normal playback recorded in a part or all of said recording areas of data for special playback.

9. A recorded signal generating apparatus according to claim 8, wherein said additional data modification means modifies a recording rate of said data for normal playback and a recording rate of said additional data so that a ratio of data volume of said data for normal playback recorded in each of said recording areas of data for special playback and data volume of said data for special playback may become constant.

10. A recorded signal generating apparatus according to claim 8, wherein said additional data modification means modifies a recording rate of said data for normal playback and a recording rate of said additional data so that a ratio of data volume of said data for normal playback recorded in each of said recording areas of data for special playback and data volume of said data for special playback may vary in a predetermined cycle.

11. A recorded signal generating apparatus according to claim 7, wherein said transmitted signal/recorded signal conversion means generates said data for special playback from said transmitted signal within a recording rate of said data for special playback designated by said additional data modification means, arranges said data for normal playback and said data for special playback according to a recording format of said magnetic tape to output the arranged data as said recorded signal.

12. A recorded signal generating apparatus according to claim 7, wherein said additional data includes an error correction code, and said additional data modification means modifies a recording rate of said data for normal playback and a recording rate of said additional data so as to make said data for normal playback recorded in a part or all of said recording areas of said error correction codes on said magnetic tape.

13. A recorded signal generating apparatus according to claim 7, wherein said additional data includes audio data, and said additional data modification means modifies a recording rate of said data for normal playback and a recording rate of said additional data so as to make said data for normal playback recorded in a part or all of said recording areas of said audio data on said magnetic tape.

14. A recorded signal generating apparatus according to claim 1 further comprising recording mode information display means for displaying expression based on a recording mode set by said recording mode setup means.

15. A recorded signal generating apparatus according to claim 14, wherein said recording mode information display means displays recordable time corresponding to a plurality of recording modes.

16. A recorded signal generating apparatus according to claim 1 further comprising:
identification means for identifying a sort of a cassette tape to output identification information,
wherein said recording mode setup means sets a recording mode based on information indicating a transmission rate from said rate information extraction means, said detection signal, and said identification information.

* * * * *